US006741706B1

(12) United States Patent
McGrath et al.

(10) Patent No.: US 6,741,706 B1
(45) Date of Patent: May 25, 2004

(54) AUDIO SIGNAL PROCESSING METHOD AND APPARATUS

(75) Inventors: David Stanley McGrath, Bondi (AU); Adam Richard McKeag, Randwick (AU); Glenn Norman Dickins, Ultimo (AU); Richard James Cartwright, Alexandria (AU); Andrew Peter Reilly, Hurlstone Park (AU)

(73) Assignee: Lake Technology Limited, Ultimo (AU)

( * ) Notice: Subject to any disclaimer, the term of this patent is extended or adjusted under 35 U.S.C. 154(b) by 0 days.

(21) Appl. No.: 09/647,260

(22) PCT Filed: Jan. 6, 1999

(86) PCT No.: PCT/AU99/00002

§ 371 (c)(1), (2), (4) Date: Dec. 22, 2000

(87) PCT Pub. No.: WO99/49574

PCT Pub. Date: Sep. 30, 1999

(30) Foreign Application Priority Data

| | | |
|---|---|---|
| Mar. 25, 1998 | (AU) | PP 2595 |
| Mar. 31, 1998 | (AU) | PP 2709 |
| Mar. 31, 1998 | (AU) | PP 2710 |
| Nov. 12, 1998 | (AU) | PP 7164 |

(51) Int. Cl.[7] .......... H04B 5/00

(52) U.S. Cl. .......... 381/22; 381/309; 381/310

(58) Field of Search .......... 381/309, 310, 381/17–23, 1

(56) References Cited

U.S. PATENT DOCUMENTS

| | | | | |
|---|---|---|---|---|
| 5,438,623 A | | 8/1995 | Begault | |
| 5,491,754 A | | 2/1996 | Jot et al. | |
| 5,544,249 A | * | 8/1996 | Opitz | 381/63 |
| 5,596,644 A | | 1/1997 | Abel et al. | |
| 5,661,812 A | * | 8/1997 | Scofield et al. | 381/74 |
| 5,802,180 A | | 9/1998 | Abel et al. | |

FOREIGN PATENT DOCUMENTS

| | | |
|---|---|---|
| WO | WO 94/01933 | 1/1994 |
| WO | WO 95/31881 | 11/1995 |

* cited by examiner

*Primary Examiner*—Melur Ramakrishnaiah
(74) *Attorney, Agent, or Firm*—Dov Rosenfeld; Inventek

(57) ABSTRACT

A method of processing a series of input audio signals representing a series of virtual audio sound sources placed at predetermined positions around a listener to produce a reduced set of audio output signals for playback over speaker devices placed around a listener, the method comprising the steps of: (a) for each of the input audio signals and for each of the audio output signals: (i) convolving the input audio signals with an initial head portion of a corresponding impulse response mapping substantially the initial sound and early reflections for an impulse response of a corresponding virtual audio source to a corresponding speaker device so as to form a series of initial responses; (b) for each of the input audio signals and for each of the audio output signals: (i) forming a combined mix from the audio input signals; and (ii) forming a combined convolution tail from the tails of the corresponding impulse responses; (iii) convolving the combined mix with the combined convolution tail to form a combined tail response; (c)for each of the audio output signals: (i) combining a corresponding series of initial responses and a corresponding combined tail response to form the audio output signal.

22 Claims, 16 Drawing Sheets

TRADITIONAL "OVER-SAVE" METHOD

TRADITIONAL "OVER-SAVE" METHOD

AUDIO SIGNAL PROCESSING METHOD AND APPARATUS

FIELD OF THE INVENTION

The present invention relates to the field of audio signal processing and, in particular, discloses efficient convolution methods for the convolution of input audio signals with impulse response functions or the like.

BACKGROUND OF THE INVENTION

In International PCT Application No. PCT/AU93/00330 entitled "Digital Filter Having High Accuracy and Efficiency" filed by the present applicant, there is disclosed a process of convolution which has an extremely low latency in addition to allowing for effective long convolution of detailed impulse response functions.

It is known to utilize the convolution of impulse response functions to add "color" to audio signals so that when, for example, playback over headphones, the signals provide for an "out of head" listening experience. Unfortunately, the process of convolution, whilst utilizing advanced algorithmic techniques such as the fast fourier transform (FFT), often requires excessive computational time. The computational requirements are often increased when multiple channels must be independently convolved as is often the case when full surround sound capabilities are required. Modem DSP processors are often unable to provide for the resources for full convolution of signals, especially where real time restrictions are placed on the latency of the convolution.

Hence, there is a general need to reduce the processing requirements of a full convolution system whilst substantially maintaining the overall quality of the convolution process.

SUMMARY OF THE INVENTION

In accordance with a first aspect of the present invention, there is provided a method of processing a series of input audio signals representing a series of virtual audio sound sources placed at predetermined positions around a listener to produce a reduced set of audio output signals for playback over speaker devices placed around a listener, the method comprising the steps of: (a) for each of the input audio signals and for each of the audio output signals: (i) convolving the input audio signals with an initial head portion of a corresponding impulse response mapping substantially the initial sound and early reflections for an impulse response of a corresponding virtual audio source to a corresponding speaker device so as to form a series of initial responses; (b) for each of the input audio signals and for each of the audio output signals: (i) forming a combined mix from the audio input signals; and (ii) determining a single convolution tail; (iii) convolving the combined mix with the single convolution tail to form a combined tail response; (c) for each of the audio output signals: (i) combining a corresponding series of initial responses and a corresponding combined tail response to form the audio output signal.

The single convolution tail can be formed by combining the tails of the corresponding impulse responses. Alternatively, the single convolution tail can be a chosen one of the virtual speaker tail impulse responses. Ideally, the method further comprises the step of preprocessing the impulse response functions by: (a) constructing a set of corresponding impulse response functions; (b) dividing the impulse response functions into a number of segments; (c)

for a predetermined number of the segments, reducing the impulse response values at the ends of the segments.

The input audio signals are preferably translated into the frequency domain and the convolution can be carried out in the frequency domain. The impulse response functions can be simplified in the frequency domain by zeroing higher frequency coefficients and eliminating multiplication steps where the zeroed higher frequency coefficients are preferably utilized.

The convolutions are preferably carried out utilizing a low latency convolution process. The low latency convolution process preferably can include the steps of: transforming first predetermined block sized portions of the input audio signals into corresponding frequency domain input coefficient blocks; transforming second predetermined block sized portions of the impulse responses signals into corresponding frequency domain impulse coefficient blocks; combining the each of the frequency domain input coefficient blocks with predetermined ones of the corresponding frequency domain impulse coefficient blocks in a predetermined manner to produce combined output blocks; adding together predetermined ones of the combined output blocks to produce frequency domain output responses for each of the audio output signals; transforming the frequency domain output responses into corresponding time domain audio output signals; outputting the time domain audio output signals.

In accordance with a further aspect of the present invention, there is provided a method of processing a series of input audio signals representing a series of virtual audio sound sources placed at predetermined positions around a listener to produce a reduced set of audio output signals for playback over speaker devices placed around a listener, the method comprising the steps of: (a) forming a series of impulse response functions mapping substantially a corresponding virtual audio source to a corresponding speaker device; (b) dividing the impulse response functions into a number of segments; (c) for a predetermined number of the segments, reducing the impulse response values at the ends of the segment to produce modified impulse responses; (d) for each of the input audio signals and for each of the audio output signals: (i) convolving the input audio signals with portions of a corresponding modified impulse response mapping substantially a corresponding virtual audio source to a corresponding speaker device.

In accordance with a further aspect of the present invention, there is provided a method for providing for the simultaneous convolution of multiple audio signals representing audio signals from different first sound sources, so as to simulate an audio environment for projection from a second series of output sound sources comprising the steps of: (a) independently filtering each of the multiple audio signals with a first initial portion of an impulse response function substantially mapping the first sound sources when placed in the audio environment: and (b) providing for the combined reverberant tail filtering of the multiple audio signals with a reverberant tail filter formed from subsequent portions of the impulse response functions.

The filtering can occur via convolution in the frequency domain and the audio signals are preferably first transformed into the frequency domain. The series of input audio signals can include a left front channel signal, a right front channel signal, a front centre channel signal, a left back channel signal and a right back channel signal. The audio output signals can comprise left and right headphone output signals.

The present invention can be implemented in a number of different ways. For example, utilising a skip protection processor unit located inside a CD-ROM player unit, utilising a dedicated integrated circuit comprising a modified form of a digital to analog converter; utilising a dedicated or programmable Digital Signal Processor; or utilizing a DSP processor interconnected between an Analog to Digital Convener and a Digital to Analog Convener. Alternatively, the invention can be implemented using a separately detachable external device connected intermediate of a sound output signal generator and a pair of headphones, the sound output signals being output in a digital form for processing by the external device.

Further modifications can include utilizing a variable control to alter the impulse response functions in a predetermined manner.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, it is desired to approximate the full long convolution of a series of input signals with impulse response functions for each ear such that the outputs can be summed to the left and right ears for playback over headphones.

Figure 1:
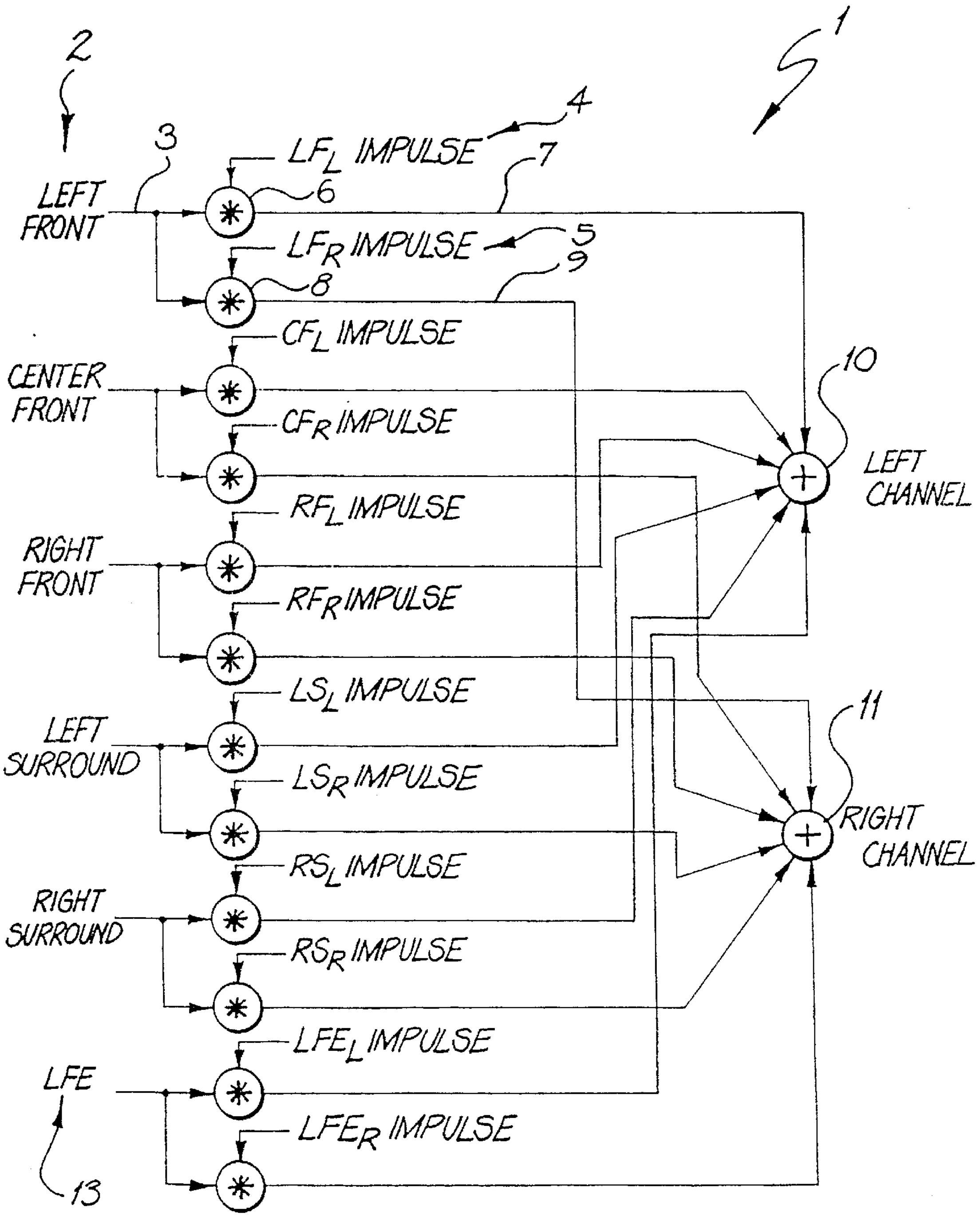
FIG. 1 illustrates schematically the overall convolution processing for mapping a series of signals to two headphone output channels.

Turning to FIG. 1, there is illustrated the full convolution process for a 6 input Dolby surround sound set of signals comprising a left front centre front, right front, left surround, right surround and low frequency effects channels each indicated generically 2. For each channel, a left and right impulse response function is applied. Hence, for the left front channel 3, a corresponding left front impulse response function 4 is convolved 6 with the left signal. The left front impulse response function 4 is an impulse response that would be received by the left ear to an idealized spike output from a left front channel speaker placed in an idealized position. The output 7 is summed 10 to the left channel signal for the headphone.

Similarly, the corresponding impulse response 5 for the right ear for a left channel speaker is convolved 8 with the left front signal to produce an output 9 which is summed II to the right channel. A similar process occurs for each of the other signals.

Hence, the arrangement of FIG. 1 will require approximately 12 convolution steps for the six input signals. Such a large number of convolutions is likely to be quite onerous for a DSP chip especially where the desired long convolution is used.

Figure 2:
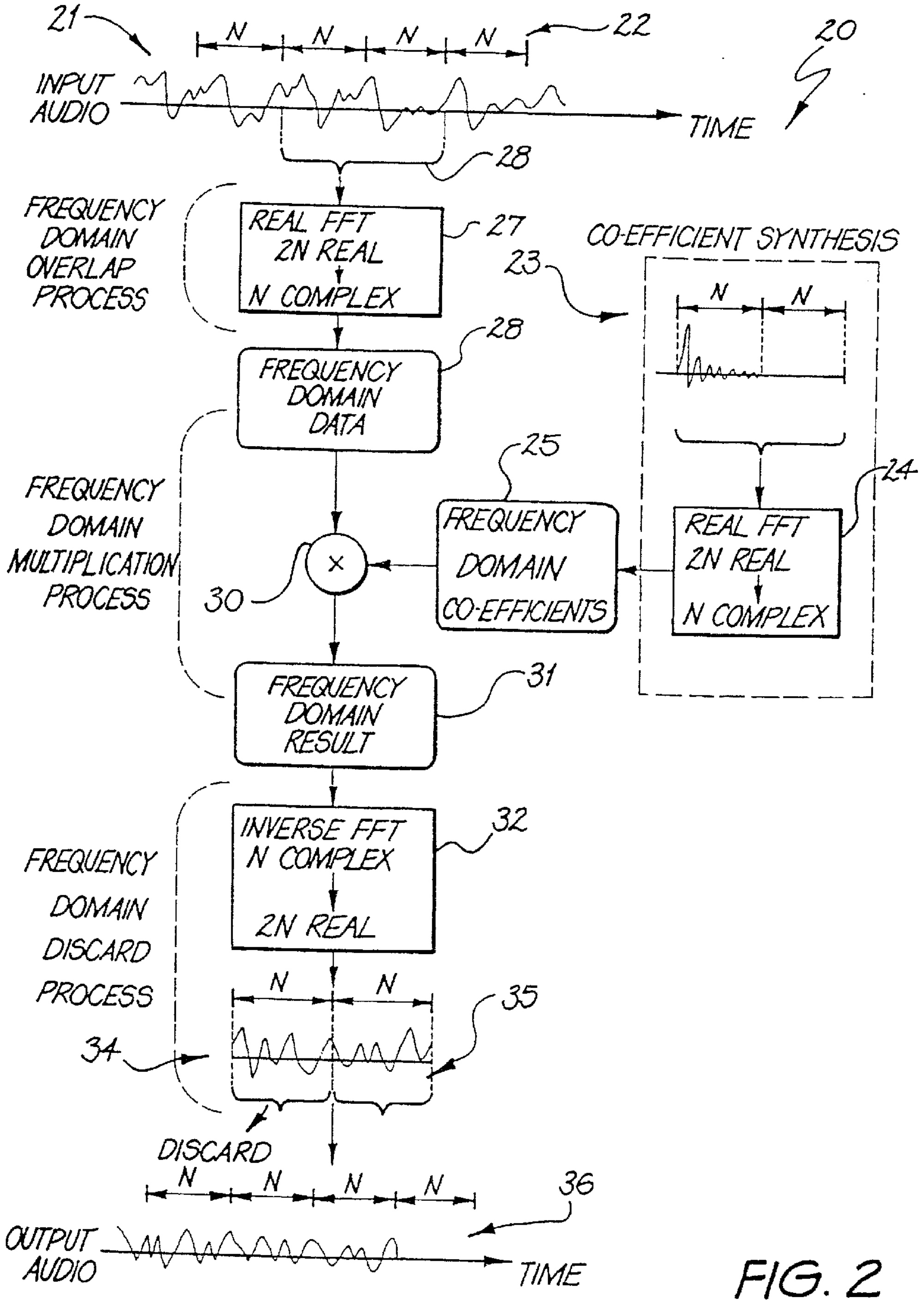
FIG. 2 illustrates the traditional overlap and save FFT process.

Turning now to FIG. 2, there is illustrated the standard "overlap and save" convolution process which is as fully set out in the standard text such as "Digital Signal Processing", by John Proakis and Dimitis Manolakis, McMillan Publishing Company, 1992.

In the traditional overlap and save method as illustrated 20 in FIG. 2, the input signal 21 is digitized and divided into N sample blocks 22 with N normally being a power of 2. Similarly, an impulse response of length N 23 is determined normally by taking desired environmental measurements, and padded to length 2N by zeros. A first mapping 24 is applied to the 2N blocks of the impulse response 23 so as to form N complex numbers having real and imaginary coefficients. The FFT is then applied to produce N Frequency coefficients. The step 24 can be carried out once before processing begins and the corresponding frequency domain coefficients 25 stored for later use.

Next, blocks of length 2N of the input audio are taken and again a fast fourier transform is applied so as to determine corresponding frequency domain data 28 corresponding to the 2N real input values. Next, the two sets of data are element-by-element multiplied 30 so as to produce frequency domain data 31. An inverse fourier transform is then applied to produce 2N real values with the first N 34 being discarded and the second N 35 becoming the output values 36 for the output audio. The process illustrated in FIG. 2 is well known as a standard frequency domain convolution process. Unfortunately however, due to requirement for input data to be collected into blocks, and due to the FFT process taking a finite time, dependent on the value of N, (the processing time is O(NlogN)), a certain latency or delay exists from when an initial 2N input values are input to the first FFT 27 and until the time of subsequent output from the inverse FFT 32. This delay or latency is often highly undesirable especially where real time requirements must be met.

In the aforementioned PCT Application No. PCT/AU93/00330 there was disclosed a method for providing for an extremely low latency convolution process suitable for real time usage. Whilst the reader is referred to the aforementioned PCT specification, a short discussion of the low latency process will now be set out with reference to FIG. 3 which illustrates 40 the basic steps of the low latency process wherein an audio input is first converted to the frequency domain by an FFT frequency domain overlap process 41. The frequency domain data is stored 42 and then passed on to subsequent storage blocks eg. 43, 44 after each convolution "cycle". The frequency domain data eg. 42 is first element-by-element multiplied 50 by a corresponding frequency domain coefficients 51 with the domain coefficients 51 corresponding to a first portion of the impulse response function.

Simultaneously, the previously delayed frequency domain data 43 is multiplied 54 with the frequency domain coefficients 53 corresponding to a later part of the impulse response function. This step is also repeated for the rest of the impulse response function. The outputs are summed element-by-element 56 so as to produce overall frequency domain data which is inverse fast fourier transformed with half the data discarded 57 so as to produce audio output 58. The arrangement of FIG. 3 allows for extremely long convolution to be carried out with low latency.

Figure 3:
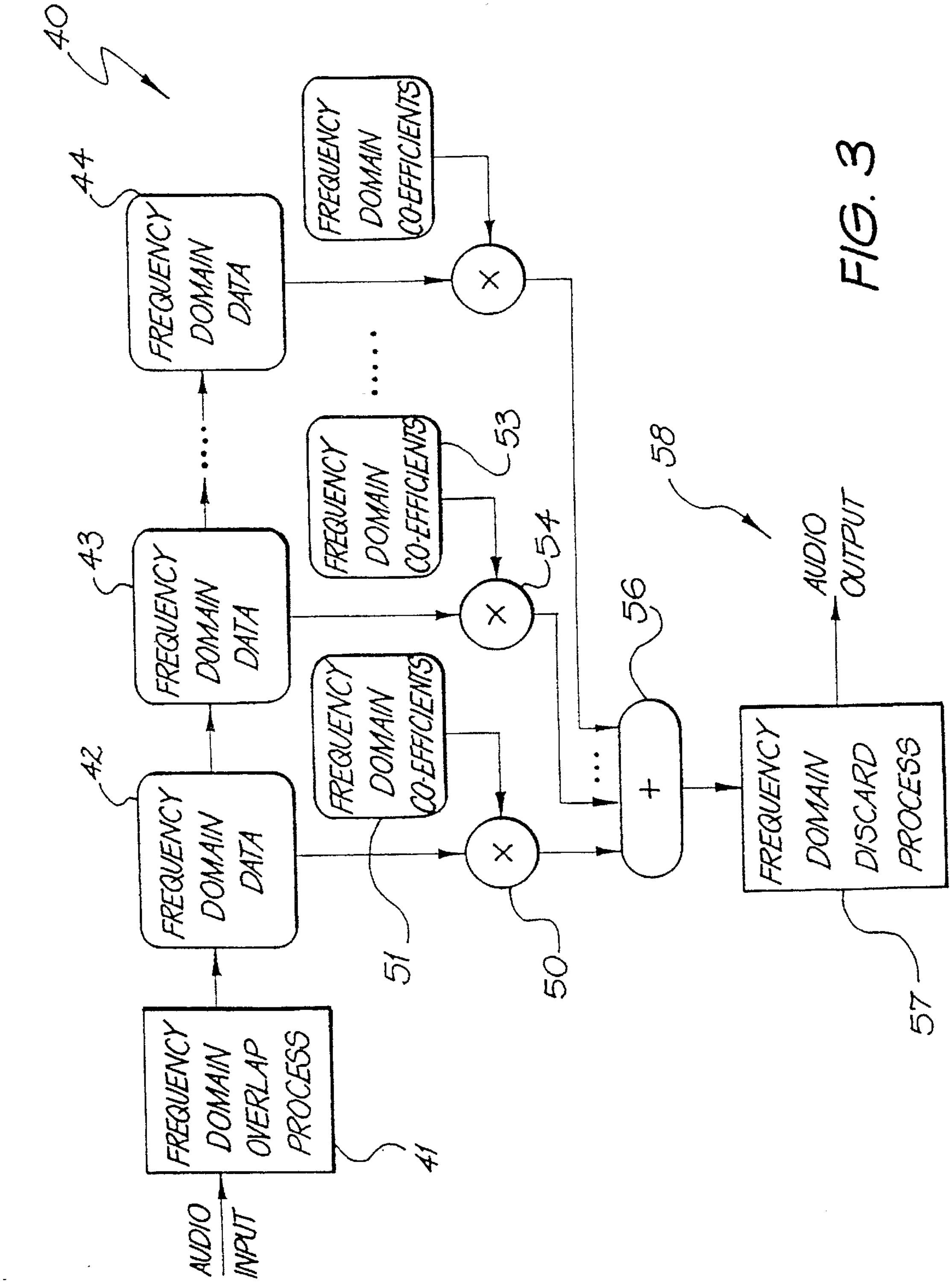
FIG. 3 illustrates the low latency process utilized in the preferred embodiment.
Figure 4:
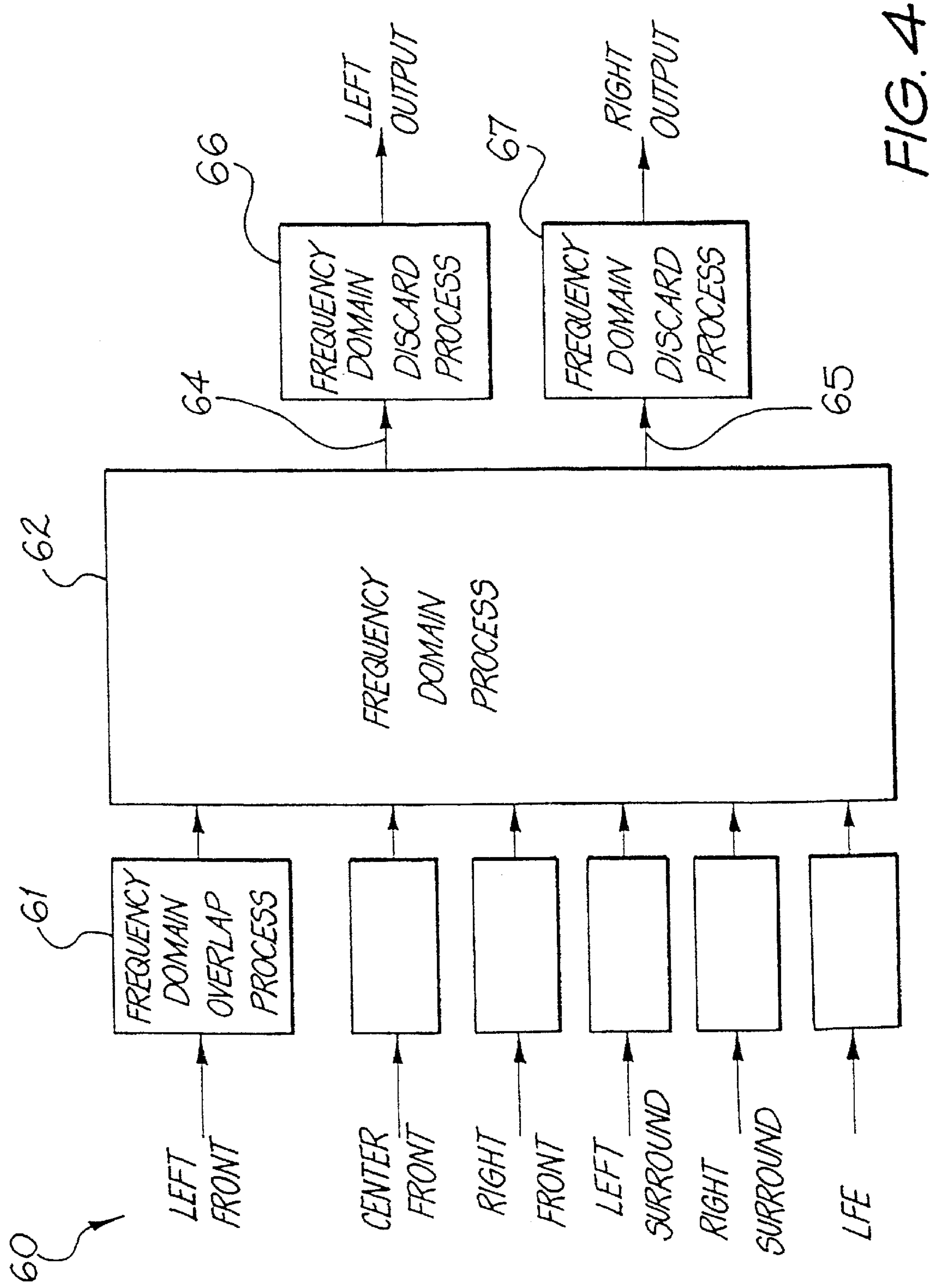
FIG. 4 is a schematic illustration of the generic frequency domain convolution process.

The general process of FIG. 3 can be utilized to perform the equivalent overall process of FIG. 1. This is illustrated in FIG. 4 wherein each of the six input channels eg. 60 is first converted into the frequency domain utilizing an FFT overlap process 61. Each channel is then combined 62 in the frequency domain with frequency domain coefficients corresponding to the impulse response functions. The frequency domain process 62 can also include the adding of the frequency components together to form left and right outputs 64, 65. Finally, an inverse frequency domain discard process 66, 67 is applied so as to produce left and right channel outputs.

The required amount of computation can be substantially reduced by simplifying the number of convolutions required.

Figure 5:
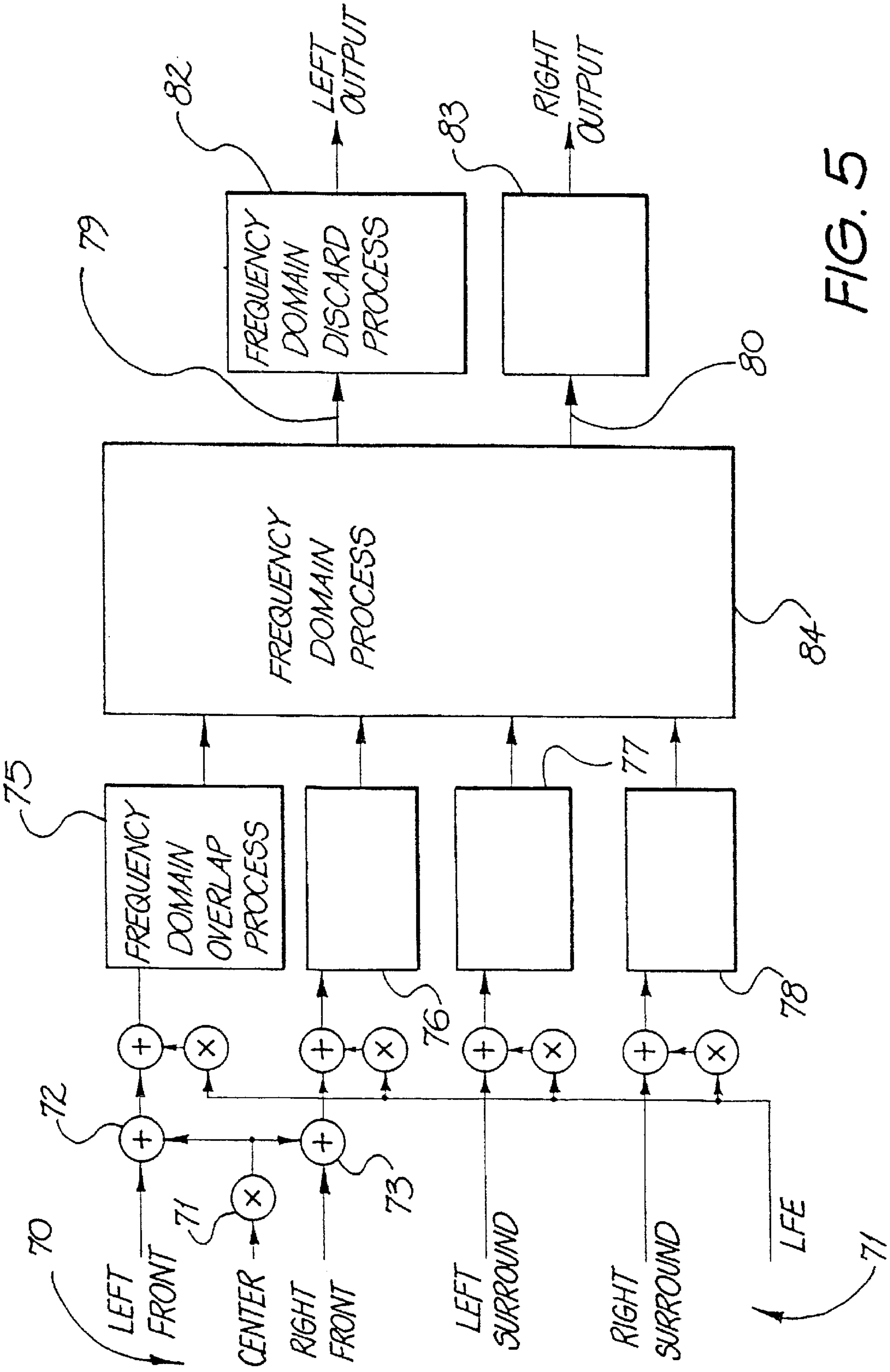
FIG. 5 illustrates a first simplification of the process of FIG. 4.

Turning now to FIG. 5, there is illustrated one form of simplification carried out in the preferred embodiment wherein the centre channel 70 is multiplied by a gain factor 71 and added 72, 73 to the left and right channels respectively. Similarly, portions of the low frequency effects channel 71 are added to each of the other channels.

The signals are then subject to a fourier transform overlap processor 75, 78 with the number of channels being subject to the computationally intensive fourier transform process being reduced from 6 to 4. Next, the fourier domain process 84 is applied to produce outputs 79, 80 from which an inverse fourier transform and discarding process 82, 83 is applied to leave the left and right channels.

Figure 6:
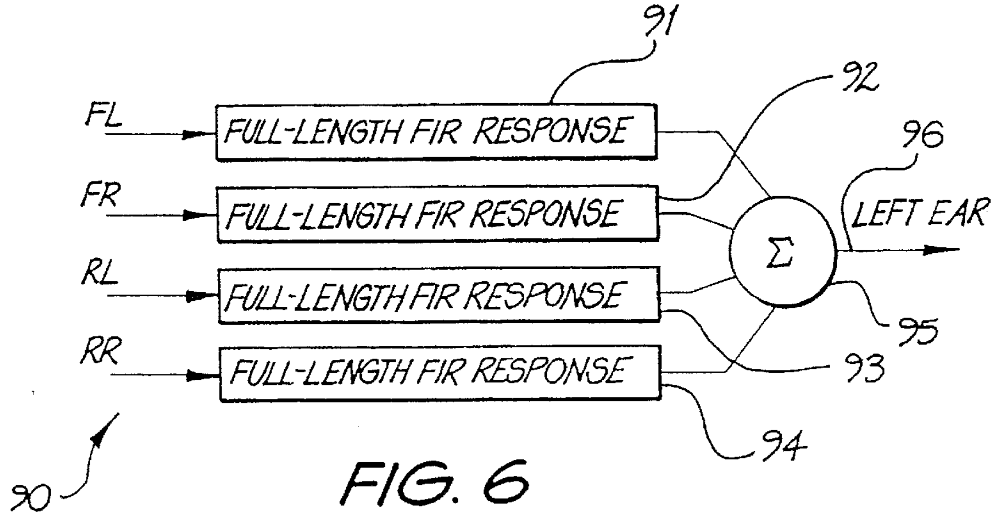
FIG. 6 illustrates the idealized processing of a series of input signals to the left ear of a headphone.

Turning now to FIG. 6, there is illustrated schematically the idealized overall end result of the process of FIG. 5 for the left ear where the four input signals 90 are each subjected to a corresponding full length finite impulse response filter 91–94 before being summed 95 to form a corresponding output signal 96. Unfortunately, in order to achieve a high level of realism, it is often necessary to utilize quite long impulse response functions. For example, impulse response functions of tap length of approximately 7,000 taps are not uncommon with standard 48 kHz audio signals. Again, with the arrangement of FIG. 6, excessive computational requirements can result with extended length filters.

An analysis of the details of the impulse response coefficients, and some experimentation, has shown that all of the cues necessary for an accurate localisation of the sound sources is contained within the time of the direct and first few orders of reflections, and that the rest of the impulse response is only required to emphasise the "size" and "liveness" of the acoustic environment. Use can be made of this observation to separate the directional or "head" part of each of the responses (say the first 1024 taps) from the reverberation or "tail" part. The "tail" parts can all be added together, and the resulting filter can be excited with the summation of the individual input signals. This simplified implementation is shown schematically 100 in FIG. 7. The head filters 101 to 104 can be short 1024 tap filters and the signals are summed 105 and fed to the extended tail filter which can comprise approximately 6000 taps, with the results being summed 109 to be output. This process is repeated for the right ear. The use of the combined tail reduces computation requirements in two ways. Firstly, there is the obvious reduction in the number of terms of convolution sums that must be computed in real time. This reduction is by a factor of the number of input channels. Secondly, the computation latency of the tail filter computation need only be short enough to align the first tap of the tail filter with the last tap of each of the head filters. When block filtering implementation techniques such as overlap/add, overlap/save, or the Low Latency convolution algorithm of the aforementioned PCT application are used, this means that, optionally, larger blocks can be used to implement the tail than the heads, at a lower frame rate.

Figure 7:
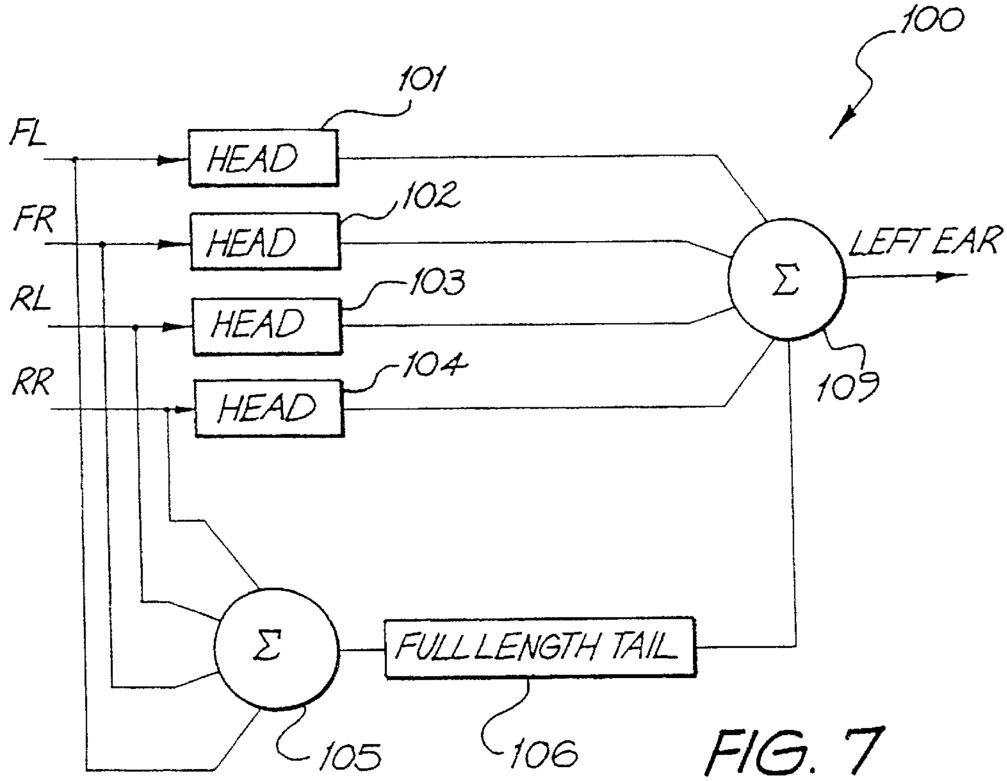
FIG. 7 illustrates a first simplification of the processing requirements of FIG. 6.
Figure 8:
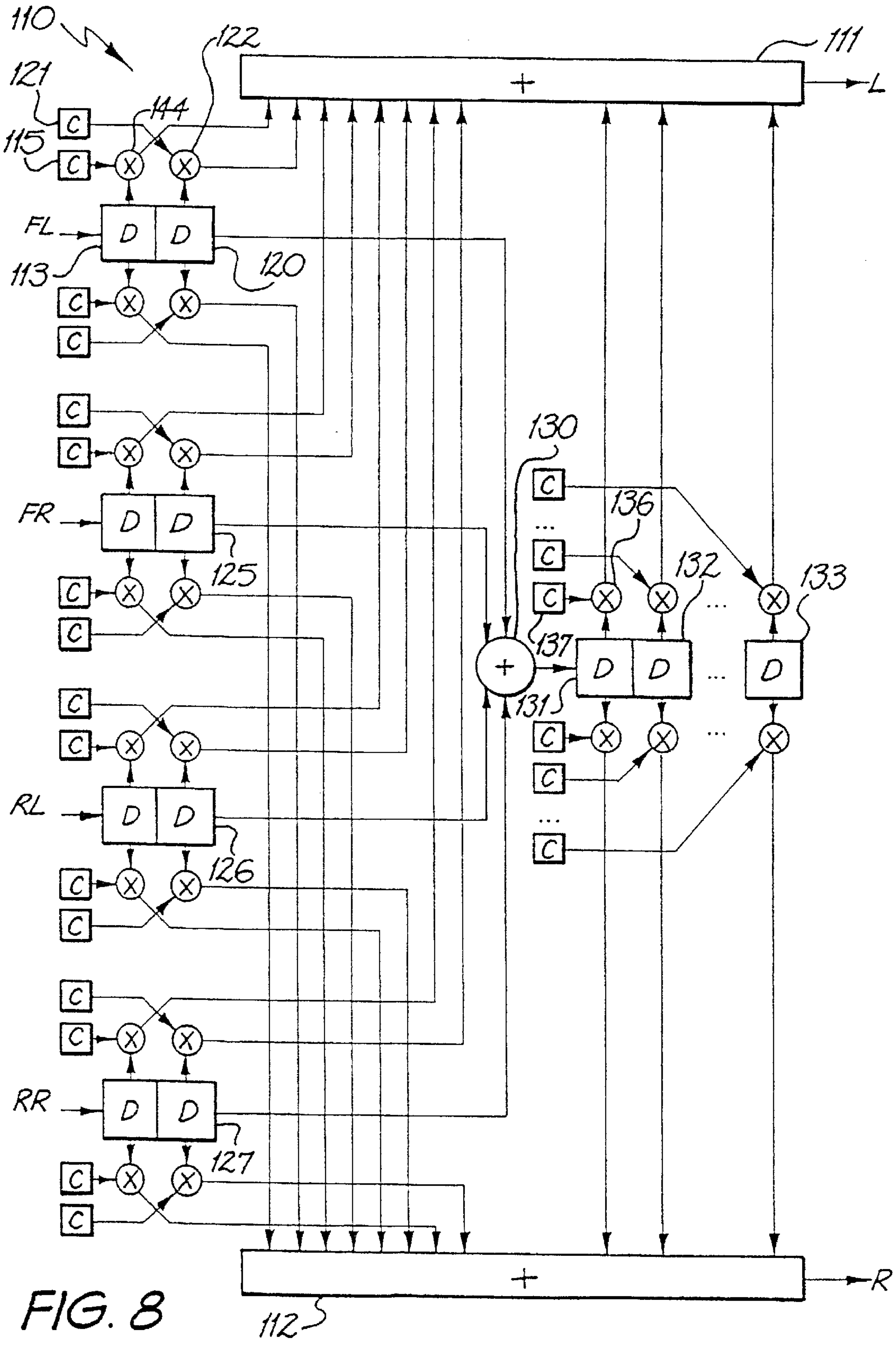
FIG. 8 illustrates in more detail a frequency domain implementation of the arrangement of FIG. 7 utilizing low latency convolution.

Turning now to FIG. 8, there is illustrated in detail an overall flow chart of the frequency domain processing when implementing the combined tail system of FIG. 7. The arrangement 110 of FIG. 8 is intended to operate as a Frequency Domain Process, such as 84 in FIG. 5. The overall system includes summations 111 and 112 for output to the left and right channels respectively. The four inputs being the front left, front right, rear left and rear right, treated symmetrically with the first input being stored in delay storage block 113 and also being multiplied 114 with frequency domain coefficients derived from a first portion of the impulse response 115 with the output going to summer 111. The right channel is treated symmetrically to produce a right channel output and shall not be further herein discussed.

After a "cycle" the delayed block 113 is forwarded to the delay block 120. It would be obvious to those skilled in the art of DSP programming that this can comprise a mere remapping of data block pointers. During the next cycle, the coefficients 121 are multiplied 122 with the data in block 120 with the output being forwarded to the left channel summer 111. The two sets of coefficients 115, and 121 correspond to the head portion of the impulse response function. Each channel will have individualised head functions for the left and right output channels.

The outputs from the delay blocks 120, 125, 126 and 127 are forwarded to summer 130 and the sum stored in delay block 131. The delay block 131 and subsequent delay blocks eg. 132, 133 implement the combined tail filter with a first segment stored in delay block 131 being multiplied 136 with coefficients 137 for forwarding to the left channel sum 111. In the next cycle, the delay block 131 is forwarded to the block 132 and a similar process is carried out, as is carried out for each remaining delay block eg. 133. Again the right channel is treated symmetrically.

It will be evident from the forgoing discussion that there are a number of impulse response functions or portions thereof used in the construction of the preferred embodiment. A further computational optimization of the process of synthesis of the frequency domain coefficient blocks will now be discussed initially with reference to FIG. 9. In order to determine the required frequency domain coefficients, an impulse response 140 is divided into a number of segments 141 of length N. Each segment is padded with an additional N zeroed valued data values 142 before an FFT mapping to N complex data is applied 143 so as to covert the values into N frequency domain coefficients 144. This process can be repeated to obtain subsequent frequency domain coefficients 145, 146, 147.

Figure 9:
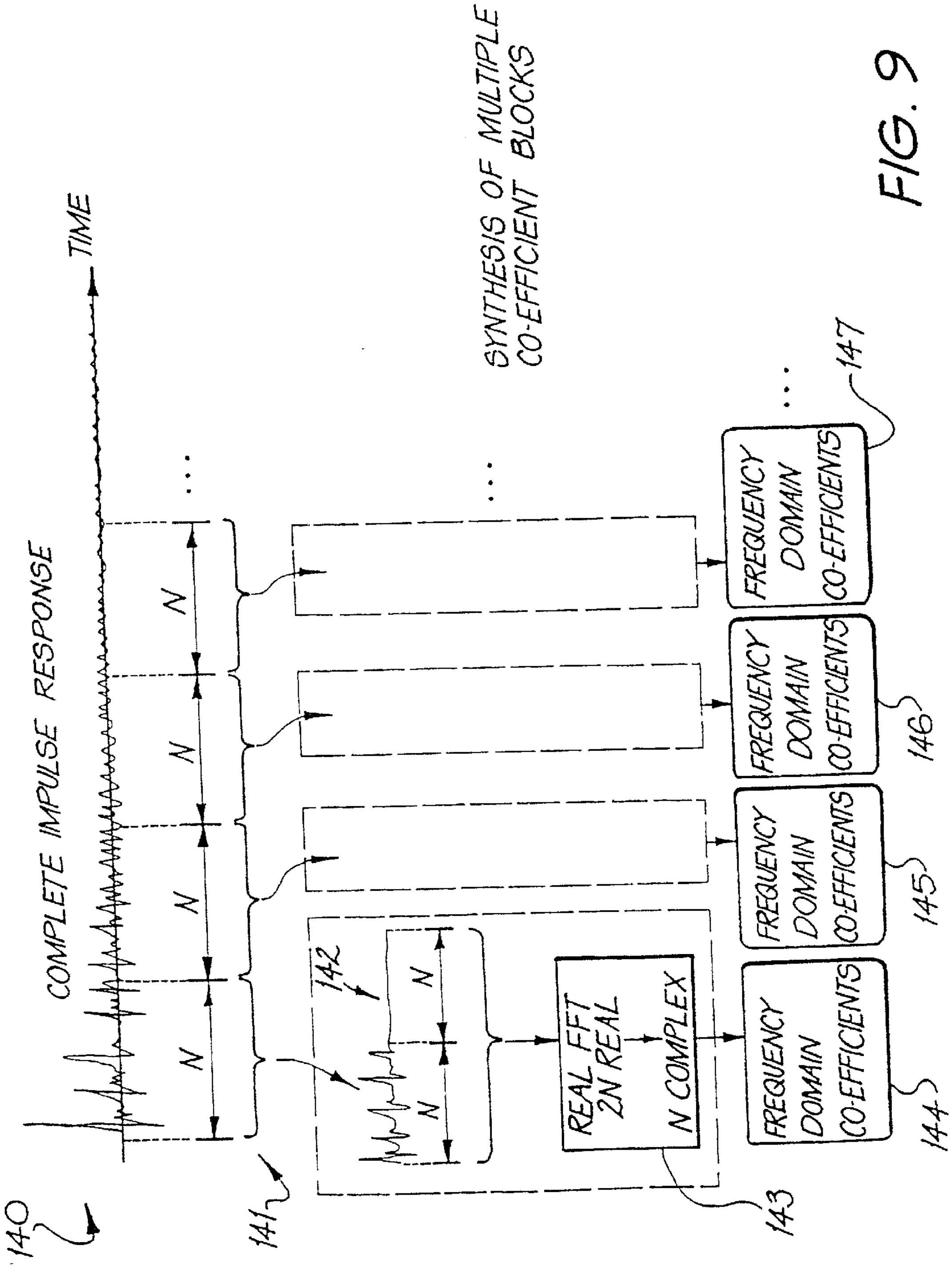
FIG. 9 illustrates the standard synthesis process for deriving frequency domain coefficients.
Figure 10:
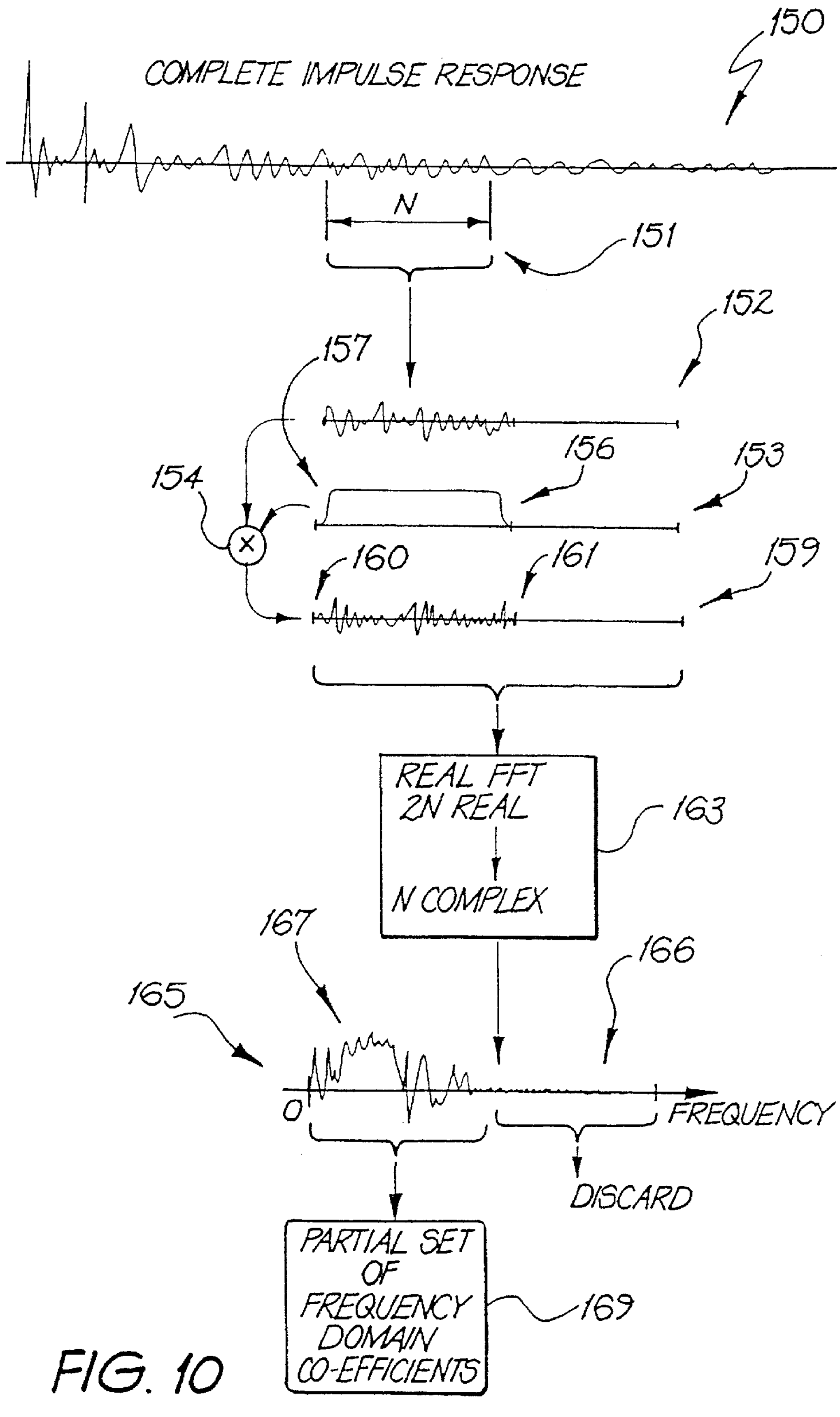
FIG. 10 illustrates a modified form of frequency domain coefficient generation.

The utilization of the segmentation process of FIG. 9 can often lead to artificially high frequency domain components. This is a direct consequence of the segmentation process and its interaction with the fast fourier transform which must result in frequency components that approximate the discontinuity at the end data values (The FFT being periodic modulo the data size). The resulting FFT often has significant high frequency components which are present substantially as a result of this discontinuity. In the preferred embodiment, a process is preferably undertaken so as to reduce the high frequency components to a point where a significant amount of the computation can be discarded due to a set of zero frequency domain components. This process of making band limited frequency domain coefficient blocks will now be discussed with reference to FIG. 10.

The initial impulse response 150 is again divided into segments of length N 151. Each segment is then padded to length 2N 152. The data 152 is then multiplied 154 with a "windowing" function 153 which includes graduated end portions 156, 157. The two end portions are designed to map the ends of the data sequence 151 to zero magnitude values whilst retaining the information in between. The resulting output 159 contains zero values at the points 160, 161. The output 159 is then subjected to a real FFT process to produce frequency domain coefficients 165 having a number of larger coefficients 167 in the lower frequency domain of the fourier transform in addition to a number of negligible components 166 which can then be discarded. Hence, a final partial set of frequency domain components 169 are utilized as the frequency domain components representing the corresponding portion of the impulse response data.

The discarding of the components 166 means that, during the convolution process, only a restricted form of convolution processing need be carried out and that it is unnecessary to multiply the full set of N complex coefficients as a substantial number of them are 0. This again leads to increased efficiency gains in that the computational requirement of the convolution process are restricted. Additionally, significant reductions in the memory requirements of the algorithm are possible by taking advantage of the fact that the data and coefficient storage can both be reduced as a result of this discarding of coefficients.

In one preferred embodiment, N is equal to 512, the head filters are 1024-taps in length, and the tail filters are 6144-taps in length. Hence the head filters are composed of two blocks of coefficients each (as illustrated in FIG. 8) and the tail filters are composed of twelve blocks of coefficients each. In this preferred embodiment, all head filters and the first 4 blocks of each tail filter are implemented utilising complete sets of coefficient fourier transforms, the next 4 blocks of each tail filter are implemented utilising coefficient blocks in which only the lower half of the frequency components are present, and the last 4 blocks of each tail filter are implemented utilising coefficient blocks in which only lower quarter of the frequency components are present.

Figure 11:
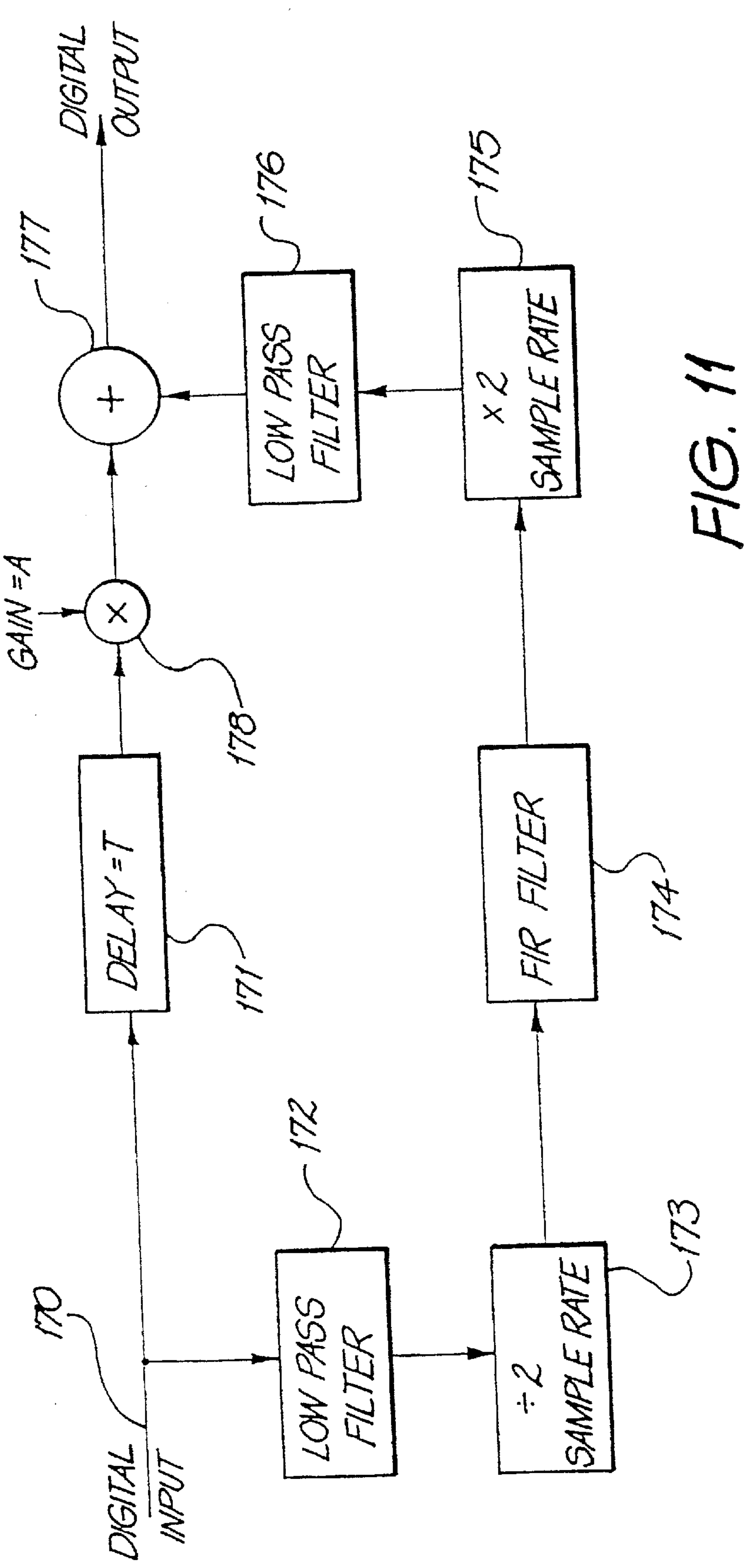
FIG. 11 illustrates the extension of the preferred embodiment to higher frequency audio data.

The preferred embodiment can be extended to the situation where higher frequency audio inputs are utilized but it is desired to maintain a low frequency computational requirement. For example, it is now common in the industry to adopt a 96 KHz sample rate for digital samples and hence it would be desirable to provide for convolution of impulse responses also sampled at this rate. Turning to FIG. 11, there is illustrated one form of extension which utilizes the lower impulse response sampling rate. In this arrangement, the input signal at a rate of 96 KHz 170 is forwarded to a delayed buffer 171. The input signal is also low pass filtered 172 and then decimated 173 by factor of 2 down to a 48 KHz rate which is then FIR filtered in accordance with the previously outlined system before the sample rate is doubled 175 followed by a low pass filter 176 wherein it is then added 177 to the originally delayed input signal forwarded out of delay buffer 171 which has been pre-multiplied 178 by a gain factor A. The output of summer 177 forming the convolved digital output.

Normally, if 96 KHz desired impulse response is denoted $h_{96}(t)$ then the 48 KHz FIR coefficients, denoted $h_{48}(t)$ could be derived from LowPass[$h_{96}(t)$], where the notation here is intended to signify that the original impulse response $h_{96}(t)$ is LowPass filtered. However, in the improved method of FIG. 11, if the desired response is denoted $h_{96}(t)$ and the delayed Impulse Response denoted $A.\delta(t-\tau)$ then the 48 KHz FIR coefficients denoted $h_{48}(t)$ can be derived from LowPass[$h_{96}(t)-A.\delta(t-\tau)$]. The choice of the delay factor $\tau$ and the gain factor A are made so that the resulting signal from the gain element 178 has the correct time of arrival and amplitude to produce the high-frequency components that are required in the direct-arrival part of the 96 KHz acoustic impulse response. Also instead of using a Delay and Gain arrangement, it would be possible to use a sparse FIR to create multiple wide-band and frequency shaped echoes.

Hence, it can be seen that the preferred embodiment provides for a reduced computation convolution system maintaining a substantial number of the characteristics of the full convolution system.

The preferred embodiments takes a multi-channel digital input signal or surround sound input signal such as Dolby Prologic, Dolby Digital (AC-3) and DTS, and uses one or more sets of headphones for output. The input signal is binaurally processed utilizing the abovementioned technique so as to improve listening experiences through the headphones on a wide variety of source material thereby making it sound "out of head" or to provide for increased surround sound listening.

Given such a processing technique to produce an out of head effect, a system for undertaking processing can be provided utilising a number of different embodiments. For example, many different possible physical embodiments are possible and the end result can be implemented utilising either analog or digital signal processing techniques or a combination of both.

In a purely digital implementation, the input data is assumed to be obtained in digital time-sampled form. If the embodiment is implemented as part of a digital audio device such as compact disc (CD), MiniDisc, digital video disc (DVD) or digital audio tape (DAT), the input data will already be available in this form. If the unit is implemented as a physical device in its own right, it may include a digital receiver (SPDIF or similar, either optical or electrical). If the invention is implemented such that only an analog input signal is available, this analog signal must be digitised using an analog to digital converter (ADC).

This digital input signal is then processed by a digital signal processor (DSP) of some form. Examples of DSPs that could be used are:

1. A semi-custom or full-custom integrated circuit designed as a DSP dedicated to the task.
2. A programmable DSP chip, for example the Motorola DSP56002.
3. One or more programmable logic devices.

In the case where the embodiment is to be used with a specific set of headphones, filtering of the impulse response functions may be applied to compensate for any unwanted frequency response characteristics of those headphones.

After processing, the stereo digital output signals are converted to analog signals using digital to analog converters (DAC), amplified if necessary, and routed to the stereo headphone outputs, perhaps via other circuitry. This final stage may take place either inside the audio device in the case that an embodiment is built-in, or as part of the separate device should an embodiment be implemented as such.

The ADC and/or DAC may also be incorporated onto the same integrated circuit as the processor. An embodiment could also be implemented so that some or all of the processing is done in the analog domain. Embodiments preferably have some method of switching the "binauraliser" effect on and off and may incorporate a method of switching between equaliser settings for different sets of headphones or controlling other variations in the processing performed, including, perhaps, output volume.

Figure 12:
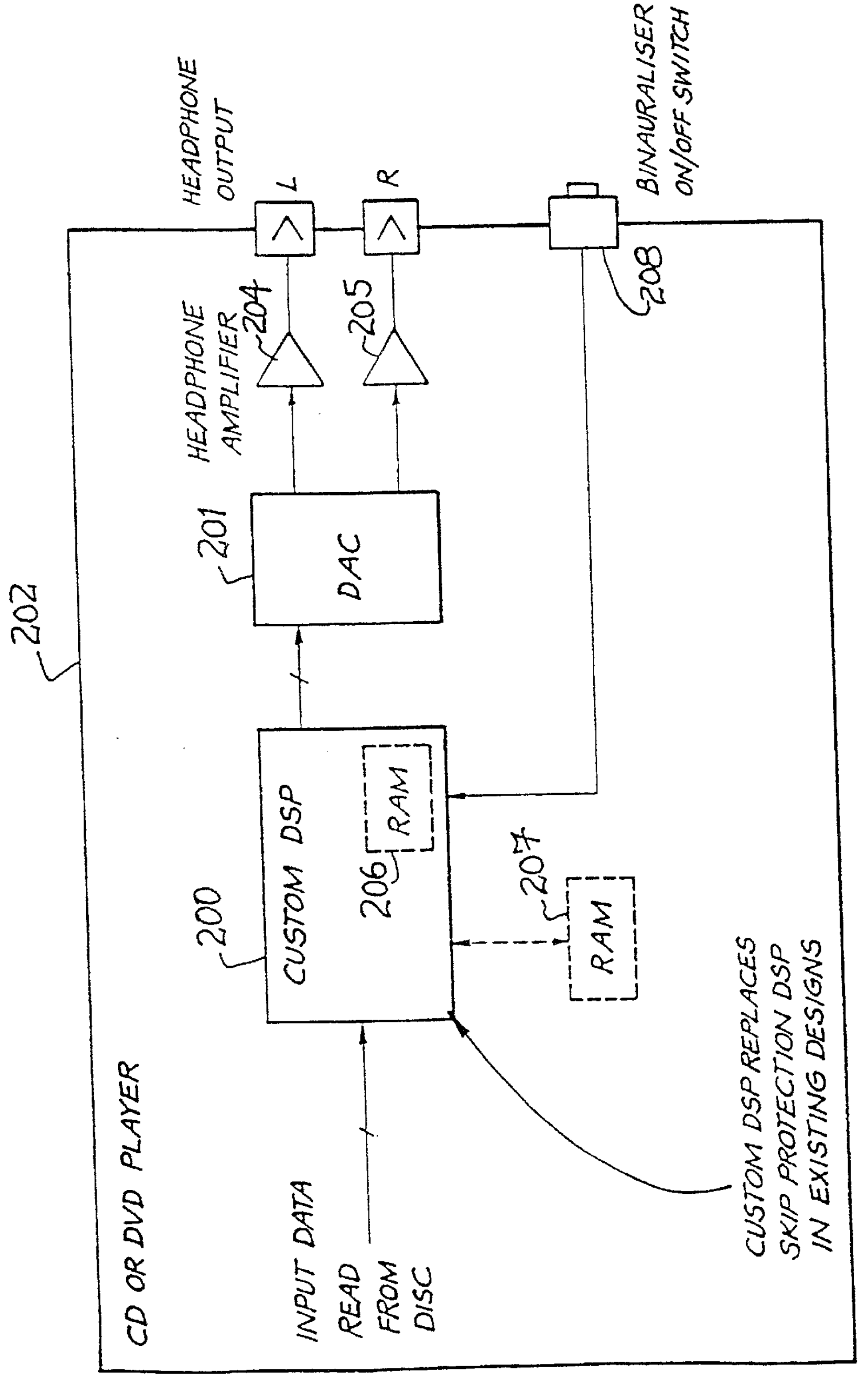
FIG. 12 illustrates an implementation whereby the audio processing circuitry is utilized in place of the skip-protection function of an existing CD player.

In a first embodiment illustrated in FIG. 12, the processing steps are incorporated into a portable CD or DVD player as a replacement for a skip protection IC. Many currently available CD players incorporate a "skip-protection" feature which buffers data read off the CD in random access memory (RAM). If a "skip" is detected, that is, the audio stream is interrupted by the mechanism of the unit being bumped off track, the unit can reread data from the CD while playing data from the RAM. This skip protection is often implemented as a dedicated DSP, either with RAM on-chip or off-chip.

This embodiment is implemented such that it can be used as a replacement for the skip protection processor with a minimum of change to existing designs. This implementation can most probably be implemented as a full-custom integrated circuit, fulfilling the function of both existing skip protection processors and implementation of the out of head processing. A part of the RAM already included for skip protection could be used to run the out of head algorithm for HRTF-type processing. Many of the building blocks of a skip protection processor would also be useful in for the processing described for this invention. An example of such an arrangement is illustrated in FIG. 12.

In this example embodiment, the custom DSP 200 is provided as a replacement for the skip protection DSP inside a CD or DVD player 202. The custom DSP 200 takes the input data from the disc and outputs stereo signals to a digital analogue converter 201 which provides analogue outputs which are amplified 204, 205 for providing left and right speaker outputs. The custom DSP can include onboard RAM 206 or alternatively external RAM 207 in accordance with requirements. A binauralizer switch 28 can be provided for turning on and off the binauralizer effect.

Figure 13:
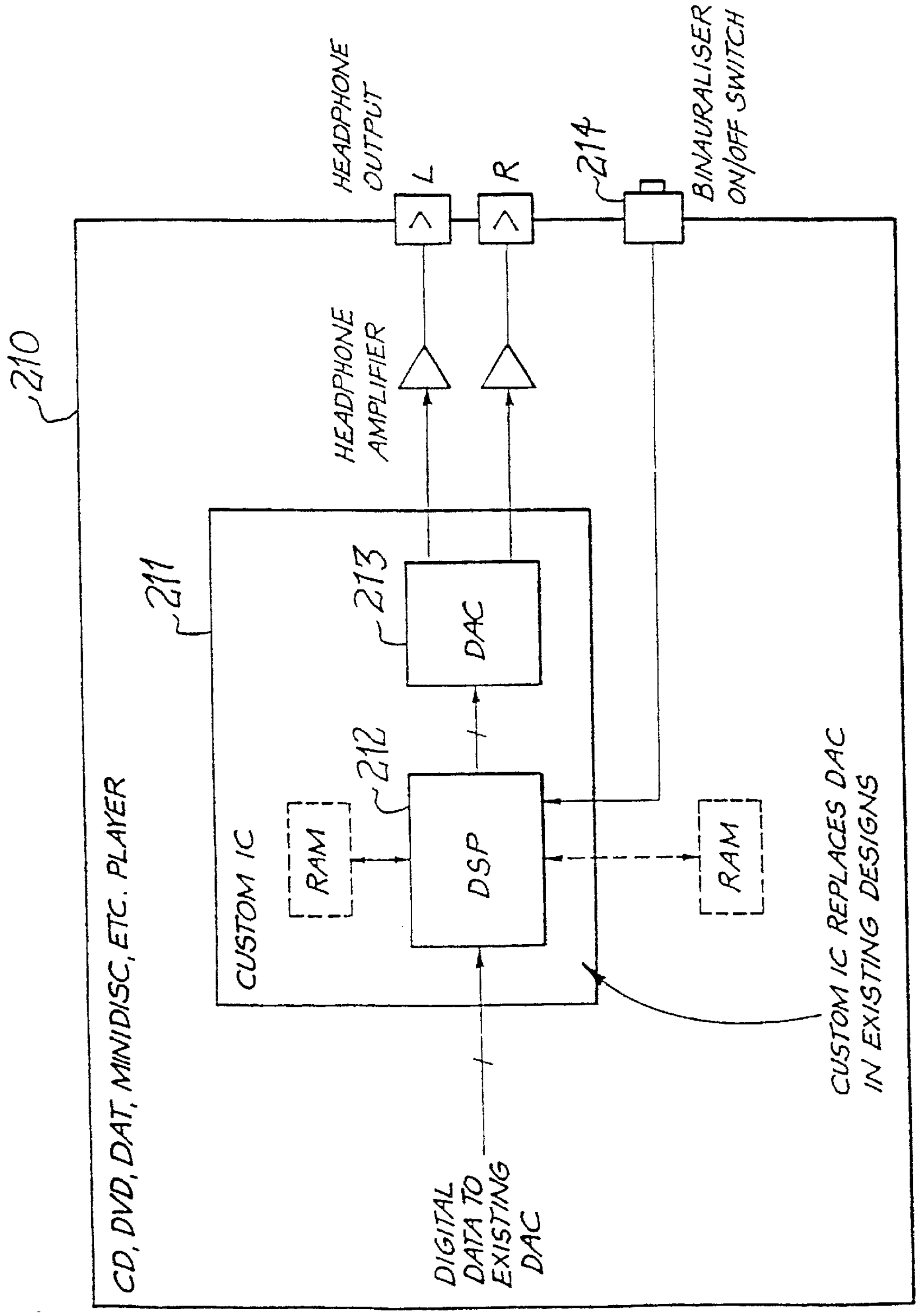
FIG. 13 illustrates an implementation whereby the audio processing circuitry is utilized within the same IC package as a Digital to Analog converter.

In a second embodiment illustrated in FIG. 13 the processing is incorporated into a digital audio device 210 (such as a CD, MiniDisc, DVD or DAT player) as a replacement for the DAC. In this implementation the signal processing is performed by a dedicated integrated circuit 211 incorporating a DAC. This can easily be incorporated into a digital audio device with only minor modifications to existing designs as the integrated circuit can be virtually pin compatible with existing DACs.

The custom IC 211 includes an onboard DSP core 212 and the normal digital analogue conversion facility 213. The custom IC takes the normal digital data output and performs the processing via DSP 212 and digital to analogue conversion 213 so as to provide for stereo outputs. Again, a binauralizer switch 214 can be provided to control binauralization effects is required.

Figure 14:
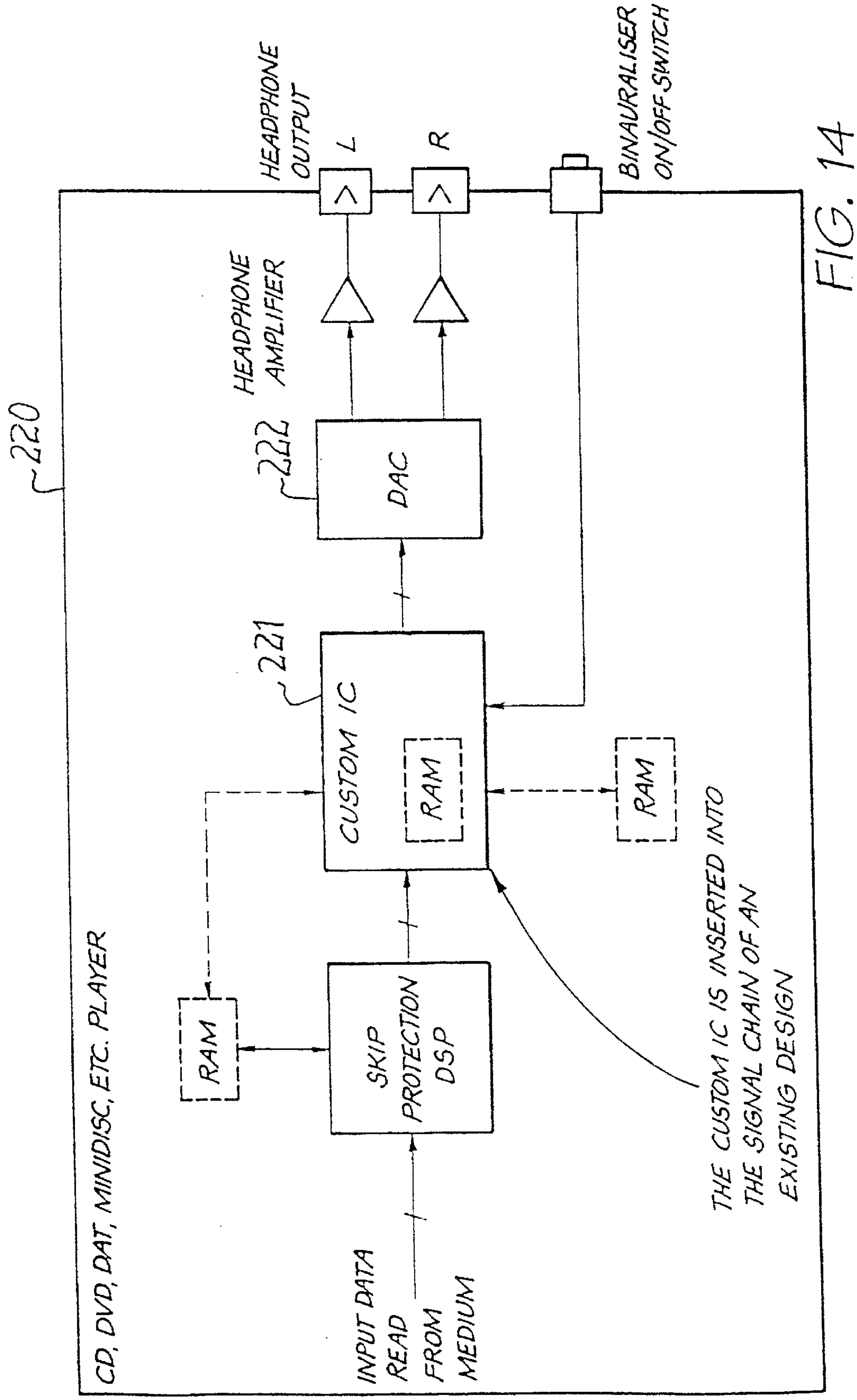
FIG. 14 illustrates an implementation whereby the audio processing circuitry is utilized in the signal chain before the Digital to Analog converter.

In a third embodiment, illustrated in FIG. 14, the processing is incorporated into a digital audio device 220 (such as a CD, MiniDisc, DVD or DAT player) as an extra stage 221 in the digital signal chain. In this implementation the signal processing is performed by either a dedicated or programmable DSP 221 mounted inside a digital audio device and inserted into the stereo digital signal chain before the DAC 222.

Figure 15:
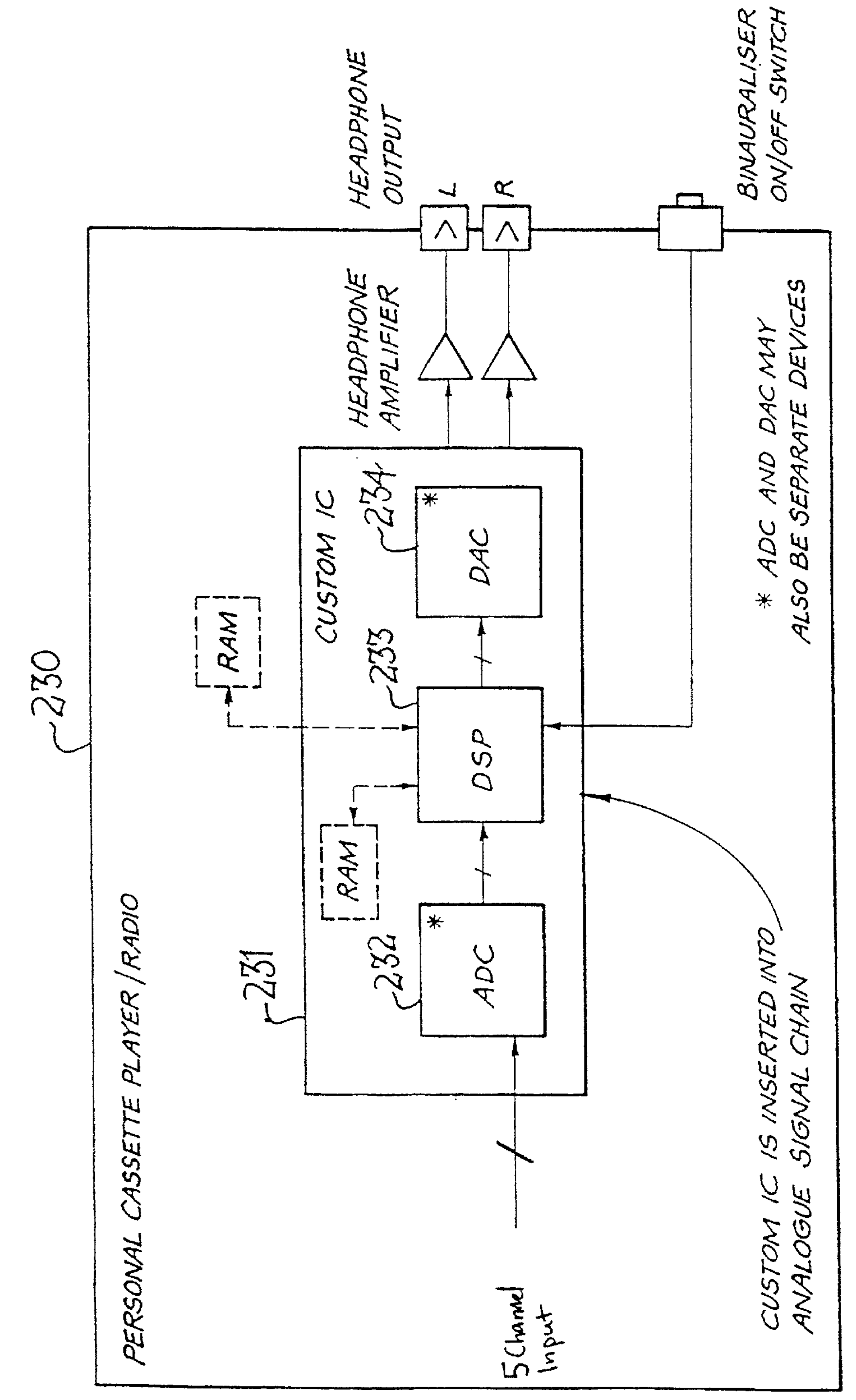
FIG. 15 illustrates an implementation whereby the audio processing circuitry is utilized in a configuation along with Analog to Digital and Digital to Analog converters.

In a fourth embodiment, illustrated in FIG. 15, the processing is incorporated into an audio device (such as a personal cassette player or stereo radio receiver 230) as an extra stage in the analog signal chain. This embodiment uses an ADC 232 to make use of the analog input signals. This embodiment can most likely be fabricated on a single integrated circuit 231, incorporating a ADC 232, DSP 233 and DAC 234. It may also incorporate some analog processing. This could be easily added into the analog signal chain in existing designs of cassette players and similar devices.

Figure 16:
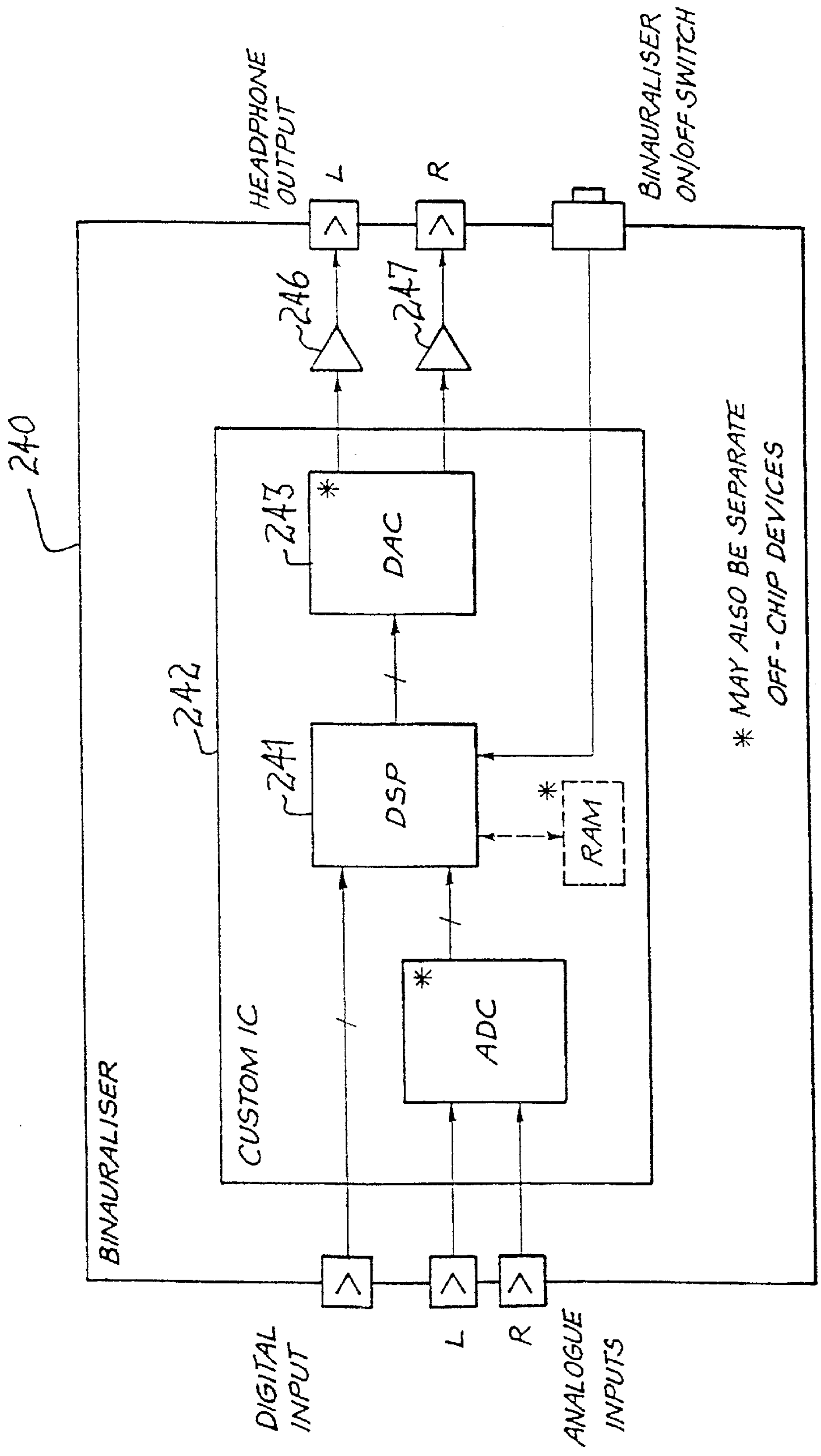
FIG. 16 illustrates an extension to the circuit of FIG. 17 to include an optional digital input.

In a fifth embodiment, illustrated in FIG. 16, the processing is implemented as an external device for use with stereo input in digital form. The embodiment can be as a physical unit in its own right or integrated into a set of headphones as described earlier. It can be battery powered with the option to accept power from an external DC plugpack supply. The device takes digital stereo input in either optical or electrical form as is available on some CD and DVD players or similar. Input formats can be SPDIF or similar and the unit may support surround sound formats such as Dolby Digital AC-3, or DTS. It may also have analog inputs as described below. Processing is performed by a DSP core 241 inside custom IC 242. This is followed by a DAC 243. If this DAC can not directly drive the headphones, additional amplifiers 246, 247 are added after the DAC. This embodiment of the invention may be implemented on a custom integrated circuit 242 incorporating DSP, DAC, and possibly headphone amplifier.

Alternatively, the embodiment can be implemented as a physical unit in its own right or integrated into a set of headphones. It can be battery powered with the option to accept power from an external DC plugpack supply. The device takes analog stereo input which is converted to digital data via an ADC. This data is then processed using a DSP and converted back to analog via a DAC. Some or all of the processing may instead by performed in the analog domain. This implementation could be fabricated onto a custom integrated circuit incorporating ADC, DSP, DAC and possibly a headphone amplifier as well as any analog processing circuitry required.

The embodiment may incorporate a distance or "zoom" control which allows the listener to vary the perceived distance or environment of the sound source. In a preferred embodiment this control is implemented as a slider control. When this control is at its minimum the sound appears to come from very close to the ears and may, in fact, be plain unbinauralised stereo. At this control's maximum setting the sound is perceived to come from a distance. The control can be varied between these extremes to control the perceived "out-of-head"-ness of the sound. By starting the control in the minimum position and slider it towards maximum, the user will be able to adjust to the binaural experience quicker than with a simple binaural on/off switch. Implementation of such a control can comprise utilizing different sets of filter responses for different distances.

Figure 17:
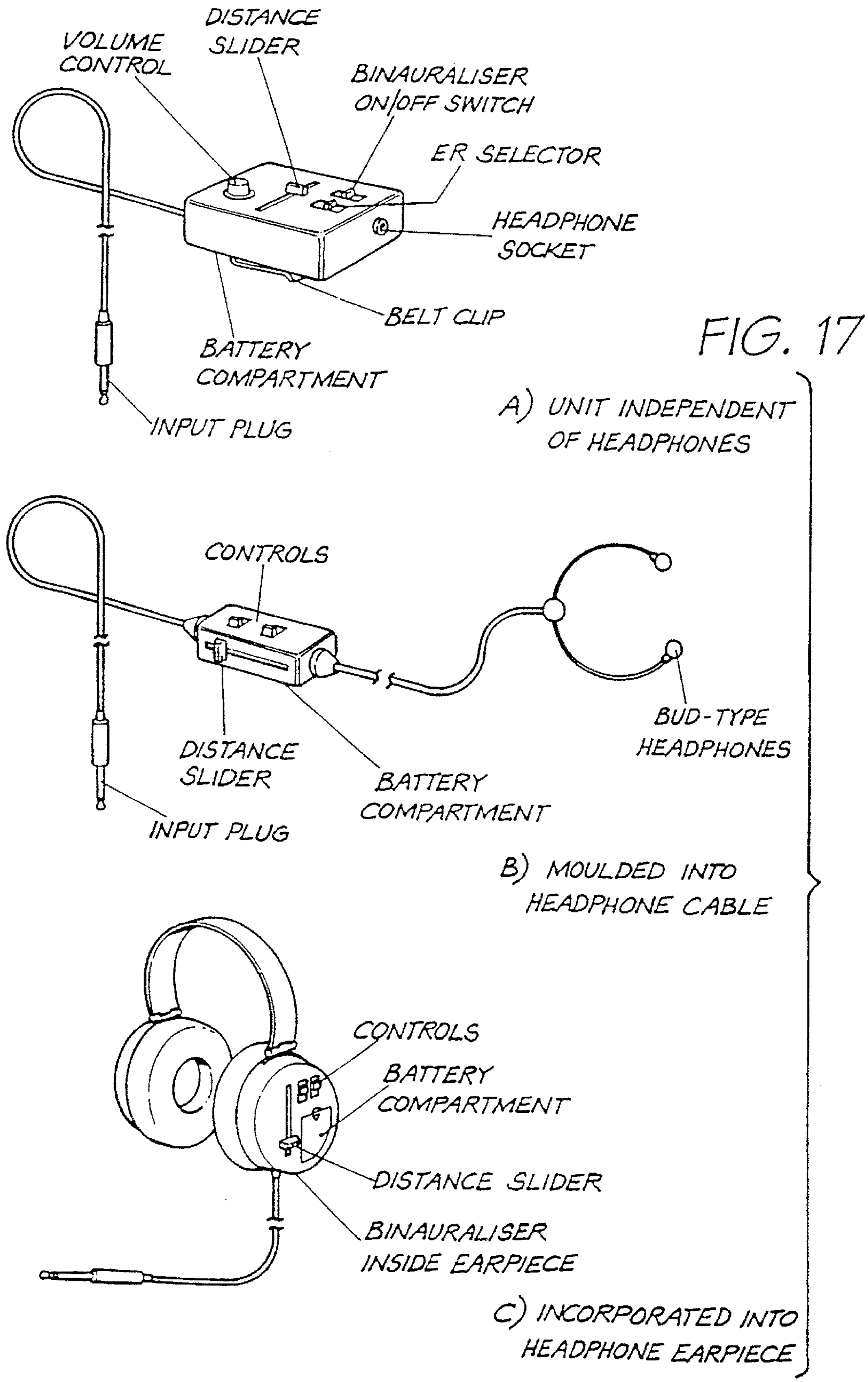
FIG. 17 illustrates a number possible physical embodiments of the current invention.

Example implementations having slider mechanisms are shown in FIG. 17. Alternatively, additional controls can be provided for switching audio environments.

As a further alternative, an embodiment could be implemented as generic integrated circuit solution suiting a wide range of applications including those set out previously. This same integrated circuit could be incorporated into virtually any piece of audio equipment with headphone output. It would also be the fundamental building block of any physical unit produced specifically as an implementation of the invention. Such an integrated circuit would include some or all of ADC, DSP, DAC, memory $I^2S$ stereo digital audio input, S/PDIF digital audio input, headphone amplifier as well as control pins to allow the device to operate in different modes (eg analog or digital input).

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method of processing a series of input audio signals representing a series of virtual audio sound sources placed at predetermined positions around a listener to produce a reduced set of audio output signals for playback over speaker devices placed around a listener, the method comprising the steps of:

(a) for each of said input audio signals and for each of said audio output signals;
   (i) convolving said input audio signals with an initial head portion of a corresponding impulse response mapping substantially the initial sound and early reflections for an impulse response of a corresponding virtual audio source to a corresponding speaker device so as to form a series of initial responses;
(b) for each of said input audio signals and for each of said audio output signals:
   (i) forming a combined mix from said audio input signals; and
   (ii) determining a single convolution tail;
   (iii) convolving said combined mix with said single convolution tail to form a combined tail response;
(c) for each of said audio output signals;
   (i) combining a corresponding series of initial responses and a corresponding combined tail response to form said audio output signal.

2. A method as claimed in claim 1 wherein said single convolution tail is formed by combining the tails of said corresponding impulse responses.

3. A method as claimed in claim 1 further comprising the step of:

preprocessing said impulse response functions by:
   (a) constructing a set of corresponding impulse response functions;
   (b) dividing said impulse response functions into a number of segments;
   (c) for a predetermined number of said segments, reducing the impulse response values at the ends of said segments.

4. A method as claimed in claim 1 wherein said input audio signals are translated into the frequency domain and said convolution is carried out in the frequency domain.

5. A method as claimed in claim 4 wherein said impulse response functions are simplified in the frequency domain by zeroing higher frequency coefficients and eliminating multiplication steps where said zeroed higher frequency coefficients are utilized.

6. A method as claimed in claim 1 wherein said convolutions are carried out utilizing a low latency convolution process.

7. A method as claimed in claim 6 wherein said low latency convolution process includes the steps of:

transforming first predetermined overlapping block sized portions of said input audio signals into corresponding frequency domain input coefficient blocks, transforming second predetermined block sized portions of said impulse responses signals into corresponding frequency domain impulse coefficient blocks;

combining said each of said frequency domain input coefficient blocks with predetermined ones of said corresponding frequency domain impulse coefficient blocks in a predetermined manner to produce combined output blocks;

adding together predetermined ones of said combined output blocks to produce frequency domain output responses for each of said audio output signals;

transforming said frequency domain output responses into corresponding time domain audio output signals;

discarding part of said time domain audio output signals;

outputting the remaining part of said time domain audio output signals.

8. A method as claimed in claim 1 wherein said series of input audio signals include a left front channel signal, a right front channel signal, a front centre channel signal, a left back channel signal and a right back channel signal.

9. A method as claimed in claim 1 wherein said audio output signals comprise left and right headphone output signals.

10. A method as claimed in claim 1 wherein said method is performed utilising a skip protection processor unit located inside a CD-ROM player unit.

11. A method as claimed in claim 1 wherein said method is performed utilising a dedicated integrated circuit comprising a modified form of a digital to analog converter.

12. A method as claimed in claim 1 wherein said method is performed utilising a dedicated or programmable Digital Signal Processor.

13. A method as claimed in claim 1 wherein said method is performed on analog inputs by a DSP processor interconnected between an Analog to Digital Converter and a Digital to Analog Converter.

14. A method as claimed in claim 1 wherein said method is performed on stereo output signals on a separately detachable external device connected intermediate of a sound output signal generator and a pair of headphones, said sound output signals being output in a digital form for processing by said external device.

15. A method as claimed in claim 1 further comprising utilizing a variable control to alter the impulse response functions in a predetermined manner.

16. A method as coined in claim 1 wherein said single convolution tail is formed by selecting one impulse response from the set of tails of said corresponding impulse responses.

17. A method of processing an input audio signal representing a virtual audio sound source placed at a predetermined position around a listener to produce a reduced set of audio output signals for playback over speaker devices placed around a listener, the method comprising the steps of, for each said speaker device:

(a) converting the input audio signal to a lower sample rate, by a low-pass filtering and decimation process, to produce a decimated input signal;

(b) applying a filtering process to said decimated input signal, to produce a decimated filtered signal;

(c) converting said decimated filtered signal to the original higher sample rate, by an interpolation and low-pass filtering process, to produce a high sample-rate filtered signal;

(d) applying a sparse filtering process to said input audio signal, to produce a sparsely filtered audio signal;

(e) summing together said high sample-rate filtered signal and said sparsely filtered audio signal to produce an audio output signal;

(f) outputting said audio output signal to said speaker device.

18. The method of claim 17 wherein said sparse filtering process consists of a single delay element and a gain function.

19. The method of claim 18 wherein said sparse filtering process consists of a delay line, with multiple tapped audio signals taken from the delay line, each said tapped audio signal scaled through a gain function, and the outputs of said gain functions added to produce said a sparsely filtered audio signal.

20. A method for processing input audio signals representing a plurality of audio sound sources at corresponding positions relative to a listener to generate one or more output signals for presentation to convey spatial impressions of the corresponding positions to the listener, wherein for a respective output signal, the method comprises:

generating a plurality of first filtered signals by applying frequency-domain representations of respective first filters to frequency-domain representations of respective input audio signals;

generating a second filtered signal by applying a frequency domain representation of a second filter to a mix of the frequency-domain representations of the input audio signals, wherein one or more high-frequency coefficients of the frequency-domain representation of the second filter and of the mix of frequency-domain representations of the input audio signals are excluded from the applying; and generating the respective output signal by combining the first filtered signals and the second filtered signal.

21. A method according to claim 20, wherein one or more high-frequency coefficients of the frequency-domain representations of respective first filters and of the frequency-domain representations of respective input audio signals are excluded from the applying.

22. A method according to claim 20, wherein the first filters correspond to head portions of respective impulse responses that convey spatial impressions of the corresponding positions to the listener and the second filter corresponds to a combination of tail portions of the respective impulse responses.

* * * * *

UNITED STATES PATENT AND TRADEMARK OFFICE

CERTIFICATE OF CORRECTION

PATENT NO. : 6,741,706 B1

DATED : May 25, 2004

INVENTOR(S) : McGrath et al.

It is certified that error appears in the above-identified patent and that said Letters Patent is hereby corrected as shown below:

Column 3,

Lines 7-8, please change “between an Analog to Digital Covener and a Digital to Analog Convener” to -- between an Analog to Digital Converter and a Digital to Analog Converter --.

Column 4,

Line 6, please change “comprising a left front centre front,” to-- comprising a left front, centre front, --

Line 19, please change “II” to -- 11 --.

Column 11,

Line 35, please change “signals;” to -- signals: --.

Signed and Sealed this

Twenty-seventh Day of July, 2004

JON W. DUDAS

*Acting Director of the United States Patent and Trademark Office*

UNITED STATES PATENT AND TRADEMARK OFFICE

CERTIFICATE OF CORRECTION

PATENT NO. : 6,741,706 B1
DATED : May 25, 2004
INVENTOR(S) : McGrath et al.

It is certified that error appears in the above-identified patent and that said Letters Patent is hereby corrected as shown below:

<u>Column 3,</u>
Line 57, please change "configuation" to -- configuration --.
Line 59, please change "the circuit of FIG. 17" to -- the circuit of FIG. 15 --.

<u>Column 10,</u>
Line 7, please change "is required" to -- as required --.

Signed and Sealed this

Fourteenth Day of June, 2005

JON W. DUDAS
*Director of the United States Patent and Trademark Office*